United States Patent [19]

Stephens

[11] Patent Number: 4,487,921
[45] Date of Patent: Dec. 11, 1984

[54] POLYOXADIAZOLE FROM 5-T-BUTYLISOPHTHALIC ACID

[75] Inventor: James R. Stephens, Naperville, Ill.
[73] Assignee: Standard Oil Company (Indiana), Chicago, Ill.
[21] Appl. No.: 550,971
[22] Filed: Nov. 14, 1983

Related U.S. Application Data

[63] Continuation-in-part of Ser. No. 424,607, Sep. 27, 1982, abandoned.
[51] Int. Cl.³ .............................................. C08G 73/08
[52] U.S. Cl. .................................................... 528/363
[58] Field of Search ........................................ 528/363

[56] References Cited

U.S. PATENT DOCUMENTS 3,734,893  5/1973  Studinka et al. ..................... 528/363
4,202,962  5/1980  Bach .................................... 528/363

Primary Examiner—Harold D. Anderson
Attorney, Agent, or Firm—Gunar J. Blumberg; William T. McClain; William H. Magidson

[57] ABSTRACT

A novel polyoxadiazole from 5-t-butylisophthalic acid is disclosed. Also, fibers, films, coatings and molded objects made therefrom.

12 Claims, No Drawings

POLYOXADIAZOLE FROM 5-T-BUTYLISOPHTHALIC ACID

This application is a continuation-in-part application of Ser. No. 424,607 filed Sept. 27, 1982, now abandoned.

BACKGROUND OF THE INVENTION

The field of this invention relates to novel homopolyoxadiazoles soluble in organic solvents such as n-cresol and useful as coatings, molded objects, films and fibers.

In the prior art, the article by Y. Iwakura, et al., in *The Journal of Polymer Science* (A) 3, page 45 (1965) a method for the synthesis of polyoxadiazoles from hydrazine sulfate and simple diacids such as terephthalic acid is disclosed. Other prior art references include the article by R. S. Jones, et al., in *The Journal of Applied Polymer Science*, Vol. 25, pages 315–321 (1980), British Patent Specification No. 1,455,776; Canadian Pat. No. 882,785 and the article by S. K. Varma, et al., in *The Journal of Applied Polymer Science*, Volume 26, pages 571–577 (1981).

The following Japanese patents further illustrate the prior art: Nos. J79,029,509-B42; J79,034,732-B47; J80,027,918-C34 and J50,037,778-W28 and U.S. Pat. No. 3,238,183.

None of the foregoing references contemplates polyoxadiazoles soluble in m-cresol and useful as coatings, molded objects and films. In the book *Thermally Stable Polymers* by P. E. Cassidy, Marcel Dekker, Inc., New York, 1980, p. 188, the author states that "fully aromatic polyoxadiazoles are soluble only in strong acids such as concentrated sulfuric or trifluoroacetic acid."

An object of this invention is to provide a polymer from 5-t-butylisophthalic acid (5-tBIA). A further object is to provide molded objects, coatings, films and fibers from the aforementioned polyoxadiazoles.

The reaction is conducted at a temperature of about 25° to about 250° C. The polyoxadiazole has an inherent viscosity measured in sulfuric acid at 25° C. at a concentration of 0.5 g/dl of at least 2.0 and preferably about 2.1 to about 6.0 or higher.

The novel polyoxadiazole has the following repeating structure:

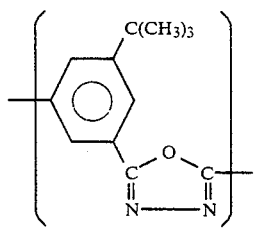

Fibers can be manufactured from the polymer in the following manner. The reaction solution, after completion of the polycondensation of the hydrazine sulfate with the appropriate diacid is cooled and mixed with sulfuric acid until a solution with the required viscosity is formed. The mixture is homogenized with stirring, and the resulting solution is filtered through an acid-proof fabric and deaerated under vacuum. The resulting spinning solution is formed into fibers using about a 0 to 55 percent aqueous solution of sulfuric acid as spinning batch. Non-washed, fresly formed fibers are oriented by stretching, for example, in air, or in a bath of about 0 to about 70 percent aqueous sulfuric acid, then washed with water to remove the sulfuric acid and dried. A useful fiber spinning method is disclosed by R. S. Jones, et al., *The Journal of Applied Polymer Science*, Vol. 25, 315–321 (1980).

The polymerization reactions can be carried out in fuming sulfuric acid or polyphosphoric acid. The following examples illustrate the preferred embodiment of the invention. It will be understood that the examples are for illustrative purposes only and do not purport to be wholly definitive with respect to conditions or scope of the invention.

EXAMPLE 1

Preparation of Poly(5'-t-butyl-1',3'-phenylene-1,3,4-oxadiazole-2,5-diyl) (PBO)

A small resin flask fitted with a sealed stirrer, pressure equalized dropping funnel and $N_2$ flow, to keep out air and carry off vent gases, was charged with a dry mixture of 5.445 grams (0.0245 mole) of 5-t-butylisophthalic acid and 3.99 grams (0.0307 mole) of hydrazine sulfate. Forty grams of fuming sulfuric acid (30 percent $SO_3$) were added all at once to the dry reactant mixture. Stirring was commenced and the flask was lowered into a hot oil bath controlled at 150° C. Stirring was continued for 30 minutes. During this time complete solution of reactants took place followed by foaming and an abrupt rise in viscosity. At the end of the heating period the reaction was barely stirrable. The near solid reaction solution was cut up and added in chunks to 500 ml. of cold distilled water in a home blender and agitated until ca. 3 mm size particles or fibrids were obtained. The polymer was then washed slowly on a filter with several portions of distilled water until the effluent had a pH of ca. 5. After air drying at room temperature, the polymer was dried 16 hours at 130° C. under vacuum to constant weight. It should be noted that PBO is soluble in m-cresol at room temperature and lower at useful concentrations, e.g., 10%; but when heated in solution at about this concentration it will crystallize and precipitate out.

EXAMPLE 2

Preparation of Poly(1',4'-phenylene-1,2,4-oxadiazole-2,5-diyl) (PPO)

A dry solids mixture of:
4.070 g of terephthalic acid (0.0245 mole) and
3.99 g of $H_4N_2 \cdot H_2SO_4$ (0.0307 mole)
was processed exactly as above to yield PPO.

EXAMPLE 3

A 10-fold scale-up of the above procedure yielded a PPO of lower inherent viscosity.

| Preparative Examples | Product Characterization | | |
|---|---|---|---|
| | 1. (PBO) | 2. (PPO) | 3. (PPO) |
| Solubility ($H_2SO_4$) | sol | sol | sol |
| Solubility m-cresol | sol | insol | insol |
| $\eta_{0.5}\ H_2SO_4$) | 4.26 | 3.54 | 2.57 |
| $\eta_{0.5}$ (m-cresol) | 1.92 | insol | insol |
| C, H, analysis, % | Found | n.t. | Found |
| | C = 70.41 | | C = 62.17 |
| | H = 5.80 | | H = 3.54 |
| | Theory | | Theory |
| | C = 71.98 | | C = 66.66 |

-continued

| Preparative Examples | Product Characterization | | |
|---|---|---|---|
| | 1. (PBO) | 2. (PPO) | 3. (PPO) |
| Dumas nitrogen, % | H = 6.04 Found N = 14.79[a,c] Theory N = 13.99 | n.t. | H = 2.80 Found N = 17.28[b,c] Theory N = 19.51 |

[a] Run under increased catalyst loading and higher temperatures.
[b] Normal Dumas nitrogen.
[c] Polyoxadiazoles do not burn well in elementary analyses--the oxadiazole structure was confirmed by infrared spectral analysis.
n.t. Not tested.

I claim:

1. A film and fiber forming crystalline homopolyoxadiazole comprising the repeating structure:

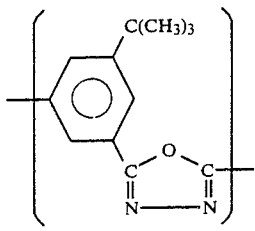

wherein the homopolyoxadiazole has an inherent viscosity of at least about 2 when measured in sulfuric acid at 25° C. at a concentration of 0.5 g/dl.

2. The polyoxadiazole of claim 1 in the form of a felt.

3. The polyoxadiazole of claim 1 in the form of a fiber.

4. The polyoxadiazole of claim 1 in the form of a film.

5. The polyoxadiazole of claim 1 in the form of a laminate.

6. The polyoxadiazole of claim 1 in the form of a coating.

7. A film and fiber forming crystalline homopolyoxadiazole comprising the repeating structure:

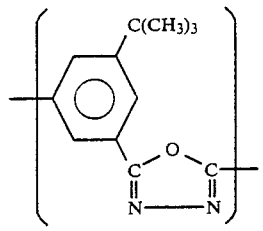

wherein the homopolyoxadiazole has an inherent viscosity of about 2.1 to about 6 or higher when measured in sulfuric acid at 25° C. at a concentration of 0.5 g/dl.

8. The polyoxadiazole of claim 7 in the form of a felt.

9. The polyoxadiazole of claim 7 in the form of a fiber.

10. The polyoxadiazole of claim 7 in the form of a film.

11. The polyoxadiazole of claim 7 in the form of a laminate.

12. The polyoxadiazole of claim 7 in the form of a coating.

* * * * *

UNITED STATES PATENT OFFICE
CERTIFICATE OF CORRECTION

Patent No. 4,487,921            Dated December 11, 1984

Inventor(s) JAMES R. STEPHENS

It is certified that error appears in the above-identified patent and that said Letters Patent are hereby corrected as shown below:

Patent

| Column | Line | |
|---|---|---|
| 1 | 8 | After "BACKGROUND OF THE INVENTION" Add -- Field of the Invention -- |
| 1 | 10 | "n-" should read -- m- -- |
| 2 | 61 | After "Solubility" Delete --(-- |
| 2 | 63 | After "no.5" Add --(-- |
| 2 | 67 | "3.54" should read -- 3.58 -- |

Signed and Sealed this

Fifteenth Day of October 1985

[SEAL]

Attest:

DONALD J. QUIGG

Attesting Officer      Commissioner of Patents and Trademarks—Designate